2,753,913

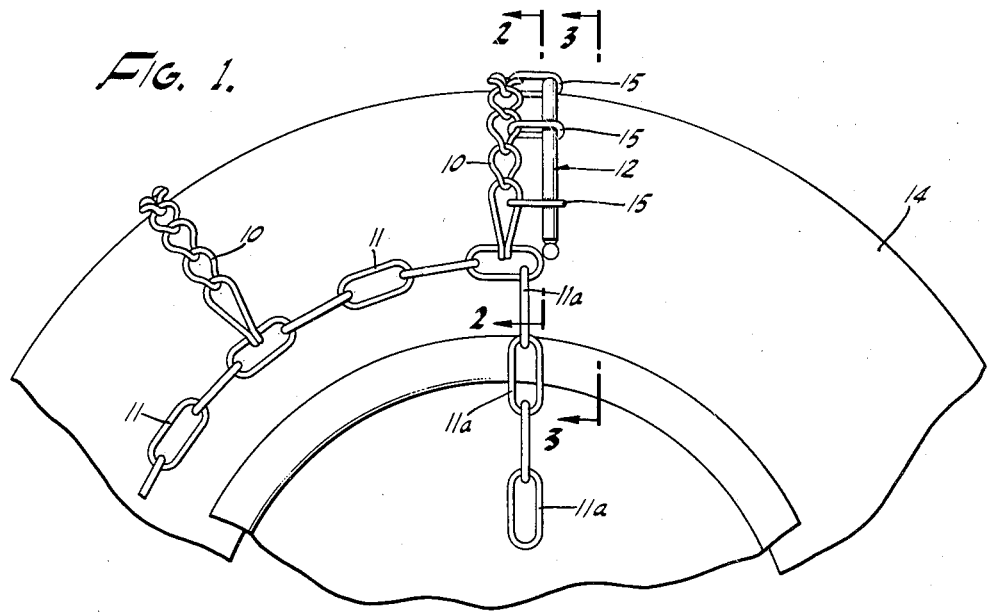
FIG. 1.
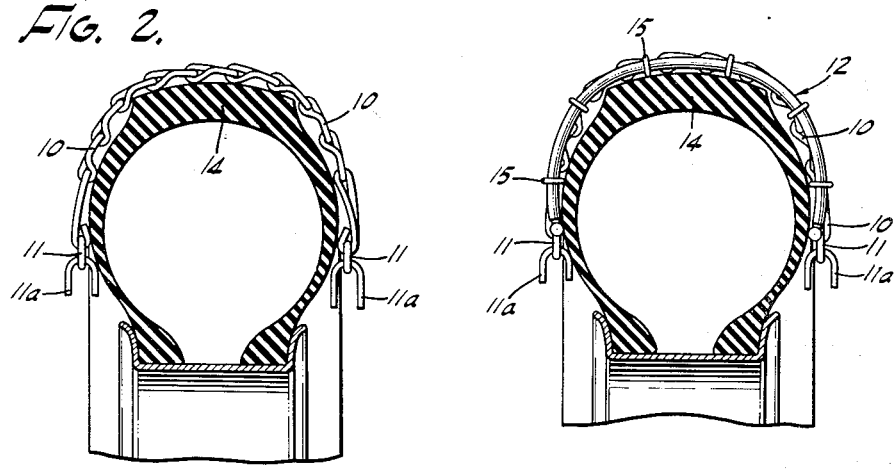
FIG. 2.
FIG. 3.
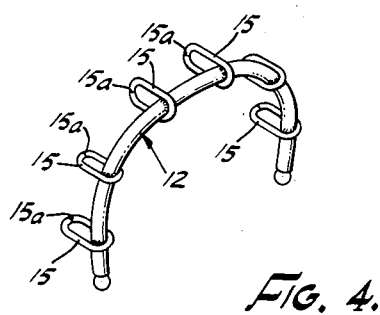
FIG. 4.
JULIUS L. UNGER
ORLANDO B. UNGER
INVENTORS
BY Lyon & Lyon
ATTORNEYS

United States Patent Office 2,753,913
Patented July 10, 1956

TIRE CHAIN

Julius L. Unger, Los Angeles, Calif., and
Orlando B. Unger, Cedar Crest, N. Mex.

Application March 9, 1953, Serial No. 341,180

2 Claims. (Cl. 152—213)

The present invention relates to improvements in tire chains particularly useful in facilitating the mounting of a tire chain on a tire.

In general, the present invention involves the use of a deformable element adapted to resiliently engage the two spaced sidewalls of a tire, such element being associated with one end of a tire chain for purposes of securing such one end to the tire in the process of mounting such tire chain to thereby facilitate the mounting operation. The resilient element may be supplied as an existing part of the tire chain or, in the alternative, may be supplied as an accessory to an existing tire chain.

Usually, a tire chain is mounted on a tire by first spreading out the tire chain on a flat surface such as a pavement or road and then rolling the tire or wheel over the chain, stopping such rolling when the tire contacts a point on the chain substantially midway between the ends thereof. Then, the free ends of the chain are wrapped around the tire and secured together somewhere near the top portion of the tire. In the newer cars where the mudguard or fender covers or embraces a substantial portion of the upper portion of the tire, thereby rendering the same inaccessible, difficulties are encountered in placing the free ends of the tire chain adjacent one another where they may be secured together. These difficulties are such that it is almost impossible to accomplish this on the newer cars with the conventional set of chains.

It is therefore an object of the present invention to provide improved means and techniques whereby chains may be mounted on a tire without encountering or obviating the aforementioned difficulties.

A specific object of the present invention is to provide improved means for facilitating the mounting of a tire chain on a tire or wheel, being applicable alike to existing tire chains as well as being capable of incorporation in tire chains in their originally manufacture.

Another specific object of the present invention is to provide means and techniques whereby the above indicated results may be accomplished in an inexpensive manner, using a structure which is rugged.

Another specific object of the present invention is to provide improved means of this character which is allowed to remain on the tire chain after the tire chain ends have been secured together to aid the tire chain in providing additional desired traction.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in side elevation of a portion of an automobile wheel having positioned thereon a portion of a tire chain embodying features of the present invention in the process of mounting such tire chain on the wheel.

Figures 2 and 3 are sectional views taken substantially on the lines 2—2 and 3—3 of Figure 1.

Figure 4 is a perspective view showing a portion of the tire chain in Figure 1 embodying the features of the present invention.

The tire chain shown in Figure 1 includes some conventional structure. This conventional structure includes a plurality of radially extending cross chain links 10 having their opposite ends attached to a corresponding one of a pair of circumferentially disposed side chains 11, one end of each of such pair of side chains 11 being provided with extra chain links 11a which are used in securing the ends of the tire chain together.

In accordance with an important feature of the present invention, there is provided additional structure which includes a deformable spring steel rod 12 adapted to conform to the contour of the tire 14, and means comprising a plurality of chain links 15 for attaching such element 12 to the first cross chain links 10.

Preferably, the chain links 15 surround the U-shaped rod 12 and are welded thereto as shown in Figure 4. These links 15 are preferably open ended as indicated at 15a to allow convenient assembly of the unit shown in Figure 4 to a conventional tire chain. For this purpose, the ends of the links 15a are first spread apart and then returned to their abutting positions shown in Figure 4 after, of course, spaced cross chain links 10 of the first element are embraced. Once this operation has been performed the unit shown in Figure 4 is considered to be a permanent part of the tire chain and, in such case, contributes to the increased traction resulting from the use of the chain.

In the process of mounting the composite tire chain on the tire, the tire chain is laid out flat on a pavement or road. But, of course, that end of the tire chain which mounts the deformable rod 12 or clamping element is bowed. The wheel or tire is then run over the other end, i. e. the flat end of the tire chain until the ground engaging portion of the tire is close to the clamping element 12. Then, the deformable clamping element 12 is slipped over the tire to resiliently engage the spaced sidewalls of the tire to thereby, for all intents and purposes, affix the first tire cross chain to the tire or wheel. The wheel or tire is then rotated in the opposite direction a distance somewhat less than one complete revolution where the first tire cross chain is again conveniently available after having traversed under the mudguard or fender of the automobile. Thus, once in such conveniently accessible position, the ends of the tire chain are secured together, using conventional means which include the links 11a.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an arrangement of the character described, a generally U-shaped resilient element adapted to lie in side by side relationship to a cross chain of a tire chain and to extend around the outer periphery of a tire and to resiliently engage the side walls of said tire, said element being sufficiently resilient to allow it to be quickly and detachably mounted on said tire, said element having a plurality of chain links secured thereto along the length thereof with said chain links extending generally circumferentially of the tire, each of said chain links connected to spaced links in said cross chain of said tire chain.

2. In an arrangement of the character described, in combination with a tire chain having a cross chain which is adapted to extend transversely and radially of a tire upon which it is mounted, a deformable element extending in side by side relationship to said cross chain and permanently connected thereto, said element being adapted to pass around the outer periphery of the tire and to resiliently engage the two spaced side walls of the tire, a plurality of chain links secured at spaced points along said deformable element, each of said chain links extending through a different link of said cross chain and serving to permanently fasten said element to said cross chain.

References Cited in the file of this patent

UNITED STATES PATENTS

| | | |
|---|---|---|
| 1,419,680 | Maguire | June 13, 1922 |
| 1,490,806 | Dohrman | Apr. 15, 1924 |
| 1,571,764 | Edwards | Feb. 2, 1926 |
| 2,511,527 | Castongay | June 13, 1950 |
| 2,643,697 | Shill | June 30, 1953 |